United States Patent [19]

Oeda

[11] 4,400,437

[45] Aug. 23, 1983

[54] THERMAL RECORDING PAPER

[75] Inventor: Yoshitaka Oeda, Ikoma, Japan

[73] Assignee: Kanzaki Paper Mfg. Co., Ltd., Tokyo, Japan

[21] Appl. No.: 368,418

[22] Filed: Apr. 14, 1982

[30] Foreign Application Priority Data

Apr. 14, 1981 [JP] Japan ................................ 56-56544

[51] Int. Cl.$^3$ ................................................ B32B 9/04

[52] U.S. Cl. .................................. 428/447; 428/464; 428/537; 428/913; 346/134

[58] Field of Search ................ 428/464, 447, 537, 913

[56] References Cited

U.S. PATENT DOCUMENTS 3,158,506 11/1964 Ellison ........................... 428/464 X 3,936,361 2/1976 Takatori et al. ................ 428/464 X 4,251,593 2/1981 Sakamoto et al. .............. 428/464 X 4,255,491 3/1981 Igarashi .............................. 428/537

*Primary Examiner*—P. Ives

*Attorney, Agent, or Firm*—Finnegan, Henderson, Farabow, Garrett & Dunner

[57] ABSTRACT

A thermal recording paper having formed on a paper support a color generating layer containing a color former and a color developer that contacts the color former to generate a color, wherein the back side of the paper is treated with an inorganic salt, an anionic high molecular weight electrolyte, an electroconductive metallic compound, alumina sol, or silica sol, and has a surface electrical resistivity of not more than $5\times10^{11}$ ohms at 25° C. and 40% RH.

1 Claim, No Drawings

THERMAL RECORDING PAPER

FIELD OF THE INVENTION

The present invention relates to thermal recording paper, and more particularly, to thermal recording paper that can be fed through and discharged from a recording apparatus without sticking.

BACKGROUND OF THE INVENTION

As is well known, thermal recording paper generates a colored image by thermally bringing a color former into contact with a color developer, which then develops a color. One of the advantages of the thermal recording paper is that it provides fairly easy maintenance of the recording apparatus, so it is now widely used as a recording medium for facsimiles, computer printers and measuring instrument printers. In the recording apparatus such as thermofacsimiles and thermoprinters, the thermal recording paper is printed with the recording head, cut with an autocutter, and discharged after passing through one or more pairs of guide rollers made of an electrically insulating material such as rubber or rigid plastics. To ensure reliable discharge, some types of apparatus arrange a discharge roller that is made of rubber or other electrically insulating materials after the auto-cutter, and which rotates at a peripheral speed slightly faster than the feed speed. In these types of apparatus, the back side of the recorded and cut paper is held in frictional contact with the discharge roller as it is being discharged, so in a low humidity atmosphere where the relative humidity is less than 40%, it often occurs that static charges built up on the recording paper cause "sticking" that prevents further discharge of the paper. Under even lower humidity conditions, "sticking" also takes place in other types of apparatus that do not use the discharge roller, because the friction of the paper against the surface of either guide roller before the auto-cutter causes a static charge buildup which prevents further feeding of the paper and may even damage the recording head.

A method has been proposed for eliminating sticking during the feeding or discharging of the thermal recording paper in a low humidity atmosphere by using a coating solution for the color generating layer that contains a large amount of sodium and other electroconductive ions. However, according to a study of the present inventors, this method of increasing the electroconductivity of the color generating layer by incorporating of a large quantity of conducting ions induces recording head wear. Furthermore, the method is hardly satisfactory when used in an apparatus that has a discharge roller, because the discharge roller is usually so arranged that its surface is in contact with the back side of the recording paper to protect the color generating layer.

SUMMARY OF THE INVENTION

The present inventor has conducted extensive studies to develop thermal recording paper that can, in a low humidity atmosphere, be smoothly fed through and discharged from any type of thermal recording apparatus such as facsimile or printer, regardless of what type guide roller mechanism is used, and without impairing the color generation and other properties of the recording paper or damaging the apparatus.

As a result, the inventor has found that this object can be attained by thermal recording paper having formed on a paper support a color generating layer containing a color former and a color developer that contacts the color former to generate a color, wherein the back side of the paper has a surface electrical resistivity of not more than $5\times10^{11}$ ohms at 25° C. and 40% RH (relative humidity).

DETAILED DESCRIPTION OF THE INVENTION

Various combinations of color former and color developer can be incorporated in the color generating layer of the present invention. For example, the combination of a colorless or pale-colored basic dye and an inorganic or organic acidic material, as well as the combination of a metal salt of higher fatty acid (e.g., ferric stearate) and a phenol, such as gallic acid, can be used.

Many compounds are known as the colorless or pale-colored basic dyes such as triarylmethane-based dyes, e.g., 3,3-bis(p-dimethylaminophenyl)-6-dimethylaminophthalide, 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3,3-bis(1,2-dimethylindole-3-yl)-5-dimethylaminophthalide, 3,3-bis(1,2-dimethylindole-3-yl)-6-dimethylaminohalide, 3,3-bis(9-ethylcarbazole-3-yl)-6-dimethylaminophthalide, 3,3-bis(2-phenylindole-3-yl)-6-dimethylaminophthalide, and 3-p-dimethylaminophenyl-3-(1-methylpyrrole-3-yl)-6-dimethylaminophthalide; diphenylmethane-based dyes, e.g., 4,4'-bisdimethylaminobenzhydryl-benzylether, N-halophenyl-leucoauramine, and N-2,4,5-trichlorophenyl-leucoauramine; thiazine-based dyes, e.g., benzoyl-leucomethyleneblue, and p-nitrobenzoyl-leucomethyleneblue; spiro-based dyes, e.g., 3-methyl-spiro-dinaphthopyran, 3-ethyl-spiro-dinaphthopyran, 3-phenyl-spiro-dinaphthopyran, 3-benzyl-spiro-dinaphthopyran, 3-methylnaphtho(6'-methoxybenzo)spiropyran, and 3-propyl-spiro-dibenzopyran; lactam-based dyes, e.g., rhodamine-B-anilinolactam, rhodamine(p-nitroanilino)lactam, and rhodamine(o-chloroanilino)-lactam; and fluoran-based dyes, e.g., 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-(N-ethyl-N-p-toluidino)-7-methylfluoran, 3-diethylamino(7-acetylmethylamino)fluoran, 3-diethylamino(7-methylamino)-fluoran, 3-diethylamino-7-(dibenzylamino)fluoran, 3-diethylamino-7-(methylbenzylamino)fluoran, 3-diethylamino-7-(chloroethylmethylamino)fluoran, 3-diethylamino-7-diethylaminofluoran, 3-(N-ethyl-N-p-toluidino)-6-methyl-7-phenylaminofluoran, 3-(N-ethyl-N-p-toluidino)-6-methyl-7-(p-toluidino)fluoran, 3-diethylamino-6-methyl-7-phenylaminofluoran, 3-diethylamino-7-(2-carbomethoxyphenylamino)fluoran, 3-(N-cyclohexyl-N-methylamino)-6-methyl-7-phenylaminofluoran, 3-pyrrolidino-6-methyl-7-phenylaminofluoran, 3-piperidino-6-methyl-7-phenylaminofluoran, 3-diethylamino-6-methyl-7-xylidinofluoran, 3-diethylamino-7-(o-chlorophenylamino)fluoran, 3-dibutylamino-7-(o-chlorophenylamino)fluoran, and 3-pyrrolidino-6-methyl-7-p-butylphenylaminofluoran. The present invention is not limited to these exemplified basic dyes. These basic dyes can be used either alone or in admixture.

Many compounds are also known as the inorganic or organic acidic material that contacts the colorless or pale-colored basic dye to generate a color, e.g., inorganic acidic materials including activated clay, acidic clay, attapulgite, bentonite, colloidal silica and aluminum silicate; and organic acidic materials including phenolic compounds such as 4-tert-butylphenol, 4-hydroxydiphenoxide, α-naphthol, β-naphthol, 4-hydroxyacetophenol, 4-tert-octylcatechol, 2,2'-dihydroxydiphenol, 2,2'-methylenebis(4-methyl-6-tert-butylphenol), 4,4'-isopropylidenebis(2-tert-butylphenol), 4,4'-sec-butylidenediphenol, 4-phenylphenol, 4,4'-isopropylidenediphenol(bisphenol A), 2,2'-methylenebis(4-chlorophenol), hydroquinone, 4,4'-cyclohexylidenediphenol, novolak phenol resins and phenolic polymers; aromatic carboxylic acids such as benzoic acid, p-tert-butylbenzoic acid, trichlorobenzoic acid, terephthalic acid, 3-sec-butyl-4-hydroxybenzoic acid, 3-cyclohexyl-4-hydroxybenzoic acid, 3,5-dimethyl-4-hydroxybenzoic acid, salicylic acid, 3-isopropylsalicylic acid, 3-tert-butylsalicylic acid, 3-benzylsalicylic acid, 3-(α-methylbenzyl)salicylic acid, 3-chloro-5-(α-methylbenzyl)salicylic acid, 3,5-di-tert-butylsalicylic acid, 3-phenyl-5-(α,α-dimethylbenzyl)salicylic acid and 3,5-di-α-methylbenzylsalicylic acid; also, salts of such phenolic compounds or aromatic carboxylic acids with polyvalent metals such as zinc, magnesium, aluminum, calcium, titanium, manganese, tin and nickel.

In the thermal recording paper of the present invention, the proportion of the color former to color developer to be incorporated in the color generating layer is properly determined depending upon the type of the color former and color developer, and if the combination of a colorless or pale-colored basic dye and an acidic material is used, 1 to 50 parts by weight, preferably 4 to 10 parts by weight, of the acidic material is used per part by weight of the colorless or pale-colored basic dye.

To prepare the coating solution for the color generating layer, the color former and color developer are dispersed, generally in water, by mechanical means such as a ball mill, attritor, or sand mill. Alternatively, the color former and color developer are separately dispersed in water, and the two dispersions are combined to form the coating solution. The coating solution usually contains a binder made of a starch, hydroxyethyl cellulose, methyl cellulose, carboxymethyl cellulose, gelatin, casein, gum arabic, polyvinyl alcohol, a styrene/maleic anhydride copolymer salt, a styrene/acrylic acid copolymer salt or a styrene/butadiene copolymer emulsion. These binders are generally used in an amount of from 10 to 40 wt%, and preferably from 15 to 30 wt%, based on the weight of the total solids content. The coating solution may also contain suitable additives, for example: a dispersant such as sodium dioctylsulfosuccinate, sodium dodecylbenzenesulfonate, a sodium salt of lauryl alcohol sulfate ester, or a metal salt of a fatty acid; an ultraviolet absorbent such as a benzophenone or triazole compound; a defoaming agent; a fluorescent brightener; or a coloring dye. To further reduce the chance of sticking problem, the coating solution may have a dispersion or emulsion of stearic acid, polyethylene, carnauba wax, paraffin wax, calcium stearate, or an ester wax. To minimize the attachment of tailings to the recording head, the coating solution may also contain an inorganic pigment such as kaolin, clay, talc, calcium carbonate, a calcined clay, titanium oxide, diatomaceous earth, finely particulated anhydrous silica, or activated clay. If desired, the coating solution may further contain stearic acid amide, stearic acid methylenebisamide, oleic acid amide, palmitic acid amide, sperm-derived oleic acid amide or coconut-derived fatty acid amide as a sensitizer.

There is no particular limitation on the method for preparing the color generating layer of the thermal recording paper, and any well known conventional method can be used, in which the coating solution is applied to the paper support by air knife coating or blade coating, and dried. There is also no particular limitation on how much coating solution should be applied to the paper support, but generally, the coating weight is from 2 to 12 $g/m^2$, and preferably from 3 to 10 $g/m^2$, on a dry basis.

As mentioned before, a central feature of the thermal recording paper of the present invention is that its back side is treated so as to have a surface electrical resistivity of not more than $5\times10^{11}$ ohms as measured at 25° C. and 40% RH. This purpose can generally be achieved by coating the back side of the recording paper having the color generating layer with a chemical such as an inorganic salt, a high molecular weight electrolyte, a moisture absorber or an electroconductive metallic compound, or impregnating or coating the paper support with such chemicals before the color generating layer is formed on it. Various chemicals are known to be usable for reducing the surface electrical resistivity of the back side of the recording, but in this invention, the use of those chemicals which induce "fog" (undesired development of color throughout the color generating layer that occurs with the elapse of time) or desensitize the color generating layer to reduce its color developing properties must be avoided.

The recording paper is usually manufactured, stored, and used in the form of a small roll, so whether the chemical is impregnated in the paper support or it is coated on the back side of the recording paper, the color generating layer remains in contact with the treated surface and there is a great chance of the chemical to be transferred to the color generating layer in a highly moistened atmosphere. To prevent this, great care must be taken in selection of chemicals. For instance, a cationic high molecular weight electrolyte causes fog, whereas a nonionic high molecular weight electrolyte causes desensitization, and either chemical reduces the commercial value of the resulting thermal recording paper. Accordingly, for purposes of the present invention, an inorganic salt, an anionic high molecular weight electrolyte, an electroconductive metallic compound such as zinc oxide or tin oxide, alumina sol, or silica sol is selected as the chemical to reduce the surface electrical resistivity of the back side of the recording paper. Suitable inorganic salts include sodium chloride, potassium chloride, lithium chloride, ammonium chloride, potassium bromide, ammonium nitrate, potassium nitrate, ammonium sulfate, potassium sulfate, potassium hydrogensulfate, potassium dihydrogenphosphate, dipotassium hydrogenphosphate, ammonium dihydrogenphosphate, sodium bromate, barium chloride dihydrate, sodium carbonate decahydrate, sodium sulfate decahydrate and zinc sulfate heptahydrate, with the sodium chloride, potassium chloride, ammonium chloride and potassium nitrate being particularly preferred due to less sticky in a highly moistened atmosphere. Suitable anionic high molecular weight electrolytes include poly(sodium styrenesulfate), poly(calcium alkylbenzenesulfonates) and poly(sodium dioctylsulfosuccinate). One or more of these chemicals are used in the form of an aqueous solution or dispersion. They may be used in conjunction with a binder, such as starch or polyvinyl alcohol, which are commonly used in the paper making industry.

While there is no particular limitation on the method for treating the back side of the recording paper, i.e., the paper support, with these chemicals, the degree of the treatment to reduce the surface electrical resistivity is very important for the purpose of the present invention, and it is necessary that the treated back side of the recording paper has a surface electrical resistivity of not more than $5\times10^{11}$ ohms at 25° C. and 40% RH. Excessive treatment results in waste of chemicals; furthermore, the recording paper can become sticky in a highly moistened atmosphere, and may even corrode the recording apparatus. Therefore, excessive treatment that reduces the surface electrical resistivity down to $1\times10^{8}$ ohms or less at 25° C. and 40% RH is desirably avoided, and the most preferred range is from $1\times10^{9}$ to $1\times10^{11}$ ohms at 25° C. and 40% RH.

The advantages of the present invention are now described in greater detail by reference to the following Examples and Comparative Examples, which are provided here for illustrative purposes only, and are not intended to limit the scope of the invention. In the Examples, all percents are by weight.

EXAMPLES 1 TO 4

As a basic dye, 3-(N-cyclohexyl-N-methylamino)-6-methyl-7-phenylaminofluoran was dispersed in water by a sand mill to prepare a 25% (solids cont.) aqueous dispersion. Individually, bisphenol A (300 g) and stearic acid amide (400 g) were dispersed in water by a sand mill to prepare a 25% aqueous dispersion. The color former dispersion (400 g) was combined with the color developer dispersion (2800 g), and in the mixture, a 20% starch solution (500 g), silicon oxide (400 g) and a suitable volume of water were dispersed to prepare a coating solution for color generating layer having a solids content of 28%. A raw paper sheet having a basis weight of 49 g/m² was size-pressed with 30 cc/m² of a 5% starch solution. The coating solution was applied onto the raw paper to provide a coating (dry weight: 8 g/m²), and dried to produce a sample of thermal recording paper. Four such thermal recording paper samples were prepared, and were coated on the back side with 2% aqueous solutions of ammonium chloride (Example 1), potassium nitrate (Example 2), potassium chloride (Example 3) and sodium chloride (Example 4) in equal weights of 10 cc/m², dried, supercalendered, and wound into four roll packs of thermal recording paper.

The packs were exposed to 25° C. and 40% RH, and the surface electrical resistivity of the back side of the each sample was measured. The packs were also exposed to 23° C. and 30% RH, in which atmosphere they were loaded in a commercial thermofacsimile (Merfas 550 of Mitsubishi Electric Corporation) for thermal recording. The image density, fog, feedability, and dischargeability data for the four samples is listed in Table 1 below.

EXAMPLE 5

A pack of thermal recording paper was prepared as in Example 1 except that 10 cc/m² of a 10% aqueous solution of sodium styrenesulfonate oligomer (Oligo Z of Tomoegawa paper Mfg. Co., Ltd.) was used as a chemical to reduce the surface electrical resistivity of the back side of the recording paper. The characteristic data for this sample is also shown in Table 1.

EXAMPLE 6

A pack of thermal recording paper was prepared as in Example 1 except that the surface electrical resistivity of the raw paper sheet was reduced by being size-pressed with 30 cc/m² of a mixture of 5% starch and 1% potassium chloride before a color generating layer was formed on it. The characteristic data for this sample is also shown in Table 1.

COMPARATIVE EXAMPLE 1

A pack of thermal recording paper was prepared as in Example 1 except that the back side of the paper was coated with 10 cc/m² of mineral-free water. The characteristic data for this comparative sample is shown in Table 1.

COMPARATIVE EXAMPLES 2 AND 3

Two packs of thermal recording paper were prepared as in Example 5 except that the back side of the paper was coated with as a cationic high molecular weight electrolyte polyvinyl benzyltrimethylammonium chloride (Comp. Ex. 2) and as a nonionic high molecular weight electrolyte polyethylene glycol monolaurate (Comp. Ex. 3). The characteristic data for these comparative samples are also shown in Table 1.

TABLE 1

| Run No. | Chemical | Amount Added | Surface Electrical(1) Resistivity (ohm) | Image Density(2) | Fog(3) | Feedability and(4) Dischargeability |
|---|---|---|---|---|---|---|
| Ex. 1 | Ammonium chloride | 0.2 g/m² | $9.3\times10^{10}$ | 1.2 | 0.09 | o |
| Ex. 2 | Potassium nitrate | " | $6.5\times10^{10}$ | " | " | o |
| Ex. 3 | Potassium chloride | " | $4.8\times10^{10}$ | " | " | o |
| Ex. 4 | Sodium chloride | " | $4.5\times10^{10}$ | " | " | o |
| Ex. 5 | Sodium styrenesulfonate oligomer | 1.0 | $3.7\times10^{10}$ | " | 0.10 | o |
| Ex. 6 | Potassium chloride | 0.3 | $4.6\times10^{10}$ | " | 0.09 | o |
| Comp. Ex. 1 | None | — | $1.5\times10^{12}$ | " | " | x |
| Comp. Ex. 2 | Polyvinyl benzyltrimethylammonium chloride | 1.0 | $1.0\times10^{10}$ | " | 0.15 | o |
| Comp. | Polyethylene glycol | " | $5.5\times10^{10}$ | 0.9 | 0.08 | o |

TABLE 1-continued

| Run No. | Chemical | Amount Added | Surface Electrical[(1)] Resistivity (ohm) | Image Density[(2)] | Fog[(3)] | Feedability and[(4)] Dischargeability |
|---|---|---|---|---|---|---|
| Ex. 3 | monolaurate | | | | | |

[(1)]Surface electrical resistivity: measured with a teraohmmeter (VE-30 of Kawaguchi Electric Works Co., Ltd.) at 10 v

[(2)]Image density: The reflection density was measured with a Macbeth densitometer (Model RD-100R of Macbeth Corp.) using an amber filter. Although the difference of 0.1 in image density near 1.0 appears to be small, a clear difference could be noted between 0.9 and 1.2 in visual evaluation. Furthermore, when the image density is 1.0 or less, the density is low even by visual observation, thus the resulting recording paper is evaluated to be low in commercial value.

[(3)]Fog: The reflection density in the non-image area was measured with the Macbeth densitometer using an amber filter. Although a low fog is preferred, when the fog exceeds 0.1, the resulting recording paper becomes low in commercial value.

[(4)]Feedability and dischargeability:
o: no sticking due to frictional electricity
x: sticking due to frictional electricity prevented discharging of the recording paper.

As Table 1 shows, the thermal recording paper samples prepared in Examples 1 to 6 could be passed through and discharged from a thermal recording apparatus without sticking in a low humidity atmosphere, and no other detrimental effects such as reduced color developing properties and fog took place.

While the invention has been described in detail and with reference to specific embodiment thereof, it will be apparent to one skilled in the art that various changes and modifications can be made therein without departing from the spirit and scope thereof.

What is claimed is:

1. A thermal recording paper comprising a color generating layer containing a color former and a color developer that contacts the color former to generate a color formed on a paper support, wherein the back side of the paper is treated with an inorganic salt, an anionic high molecular weight electrolyte, an electroconductive metallic compound, alumina sol, or silica sol, and has a surface electrical resistivity of from $1\times10^{9}$ to $1\times10^{11}$ ohms at 25° C. and 40% RH.

* * * * *